United States Patent [19]
Jeon

[11] Patent Number: 5,822,109
[45] Date of Patent: Oct. 13, 1998

[54] METHOD FOR MANUFACTURING A THIN FILM ACTUATED MIRROR ARRAY

[75] Inventor: Yong-Bae Jeon, Seoul, Rep. of Korea

[73] Assignee: Daewoo Electronics Co., Ltd., Seoul, Rep. of Korea

[21] Appl. No.: 862,530

[22] Filed: May 23, 1997

[30] Foreign Application Priority Data

May 23, 1996 [KR] Rep. of Korea ...................... 96-17802
May 23, 1996 [KR] Rep. of Korea ...................... 96-17805
May 23, 1996 [KR] Rep. of Korea ...................... 96-17806
May 23, 1996 [KR] Rep. of Korea ...................... 96-17808

[51] Int. Cl.$^6$ .................................................. G02B 26/00
[52] U.S. Cl. ......................... 359/290; 359/295; 359/846; 359/850; 310/328
[58] Field of Search .................................... 359/290, 291, 359/295, 846, 850; 310/328, 366

[56] References Cited

U.S. PATENT DOCUMENTS 5,579,179 11/1996 Ji et al. ..................................... 359/846
5,610,773 3/1997 Min ........................................... 359/850
5,627,673 5/1997 Min ........................................... 359/290

FOREIGN PATENT DOCUMENTS

0741310 11/1996 European Pat. Off. .

*Primary Examiner*—Loha Ben
*Attorney, Agent, or Firm*—Anderson, Kill & Olick, P.C.

[57] ABSTRACT

A method for the manufacturing of an array of M×N thin film actuated mirrors for use in an optical projection system, the inventive method includes the steps of: preparing an active matrix; depositing a passivation layer and an etchant stopping layer; depositing a thin film sacrificial layer; creating an array of M×N pairs of empty cavities and a continuous sacrificial area to thereby form a combination layer; forming an array of M×N actuated mirror structures, each of the actuated mirror structures including a first thin film electrode, a thin film electrodisplacive member, a second thin film electrode, an elastic member; and removing the thin film sacrificial layer, thereby forming the array of M×N thin film actuated mirrors. During the forming of the actuated mirror structures, since the iso-cut are placed above the continuous sacrificial area, even if the patterns and the iso-cuts coinside, the etchant stopping layer will not be damaged and hence during the removal of the continuous sacrificial area, the etchant will only attack the continuous sacrificial area, and the passivation layer and the active matrix located therebelow will not be affected.

3 Claims, 8 Drawing Sheets

METHOD FOR MANUFACTURING A THIN FILM ACTUATED MIRROR ARRAY

FIELD OF THE INVENTION

The present invention relates to an optical projection system; and, more particularly, to a method for manufacturing an array of M×N thin film actuated mirrors for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1A to 1F, there are shown schematic cross sectional views setting forth the steps involved in manufacturing an array 100 of M×N thin film actuated mirrors 101, wherein M and N are integer, disclosed in a copending commonly owned application, U.S. Ser. No. 08/602,928, entitled "THIN FILM ACTUATED MIRROR ARRAY FOR USE IN AN OPTICAL PROJECTION SYSTEM" now U.S. Pat. No. 5,757,539.

Figure 1A:
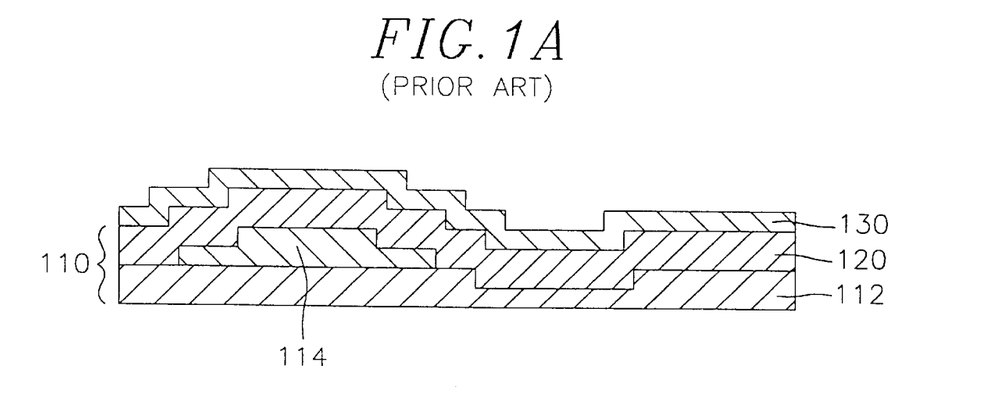
FIGS. 1A to 1F are schematic cross section views setting forth a method for manufacturing an array of M×N thin film actuated mirror previously disclosed.

The process of manufacturing the array 100 begins with the preparation of an active matrix 110 including a substrate 112 and an array of M×N connecting terminals 114.

In a subsequent step, there are formed a passivation layer 120 and an etchant stopping layer 130 on top of the active matrix 110, subsequently, as shown in FIG. 1A.

Figure 1B:
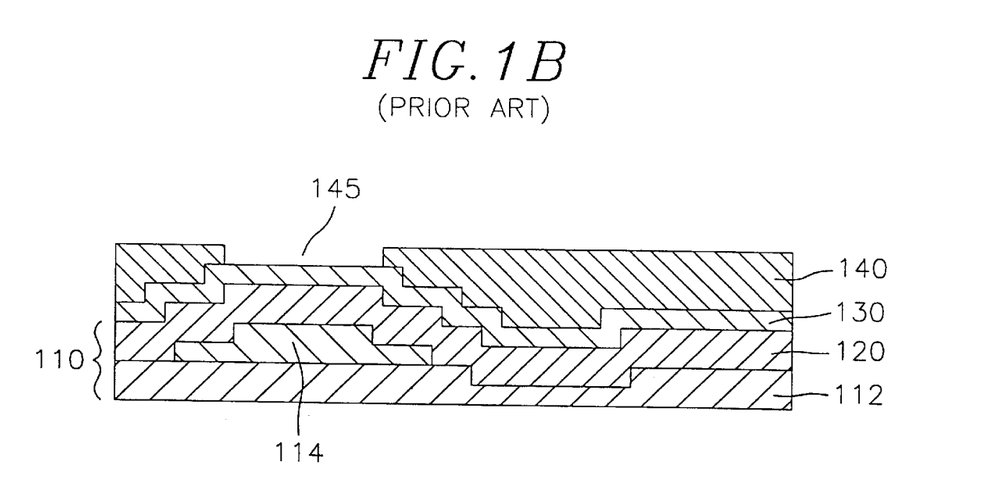

Thereafter, there is formed a thin film sacrificial layer 140 including an array of M×N pairs of empty cavities 145 on top of the etchant stopping layer 130, each of the empty cavities 145 encompassing each of the connecting terminal 114, as shown in FIG. 1B.

Figure 1C:
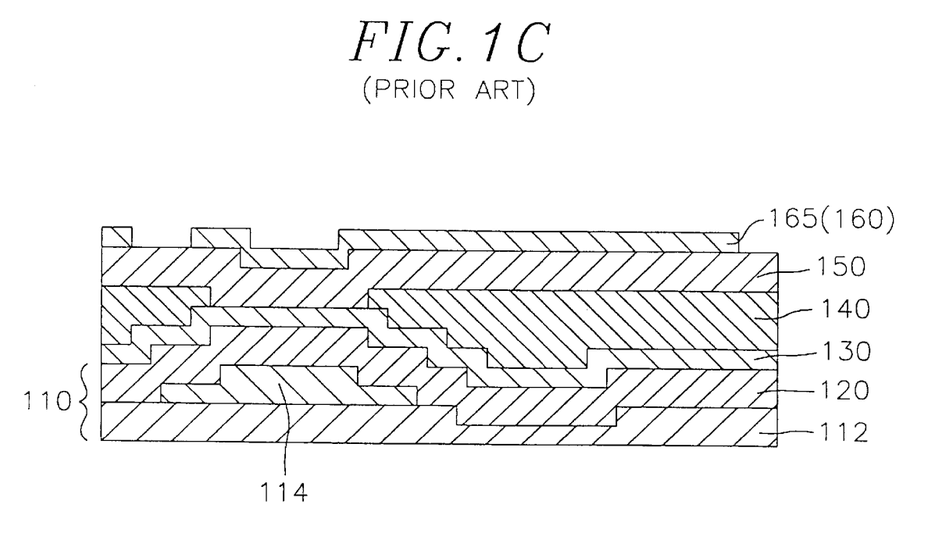

In a next step, there are formed an elastic layer 150 and a second thin film layer 160, successively, on top of the thin film sacrificial layer 140 including each of the empty cavities 145.

Then, the second thin film layer 160 is iso-cut in such a way that the second thin film layer 160 is formed into an array of M×N second thin film electrodes 165 by using a dry etching method, wherein each of the second thin film electrodes 165 is electrically disconnected from one another, as shown in FIG. 1C.

Figure 1D:
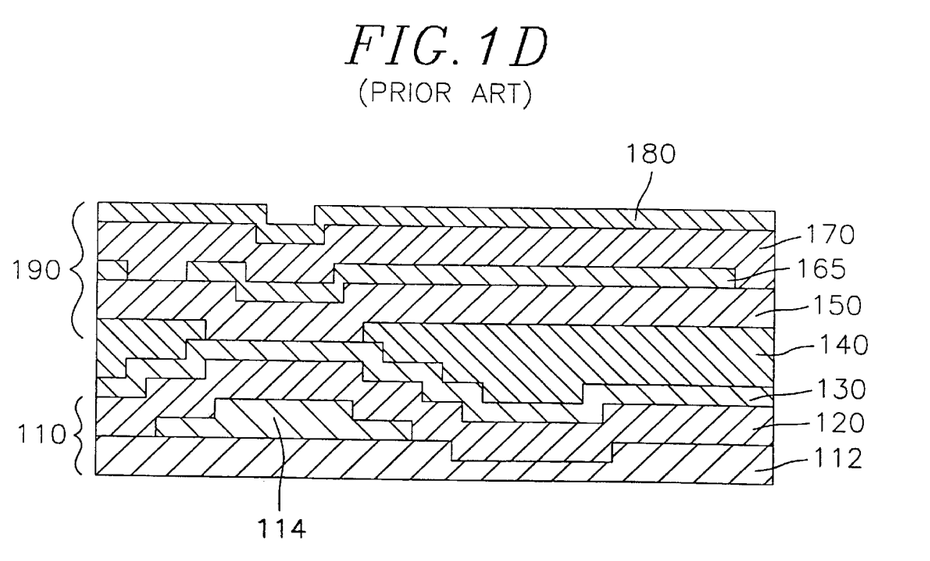

In an ensuing step, there are formed a thin film electrodisplacive layer 170 and a first thin film layer 180, successively, on top of the second thin film electrodes 165 to thereby form a multiple layered structure 190, as shown in FIG. 1D.

Subsequently, an array of M×N conduits 197 is formed from top of the thin film electrodisplacive layer 170 to top of a corresponding connecting terminals 114.

Figure 1E:
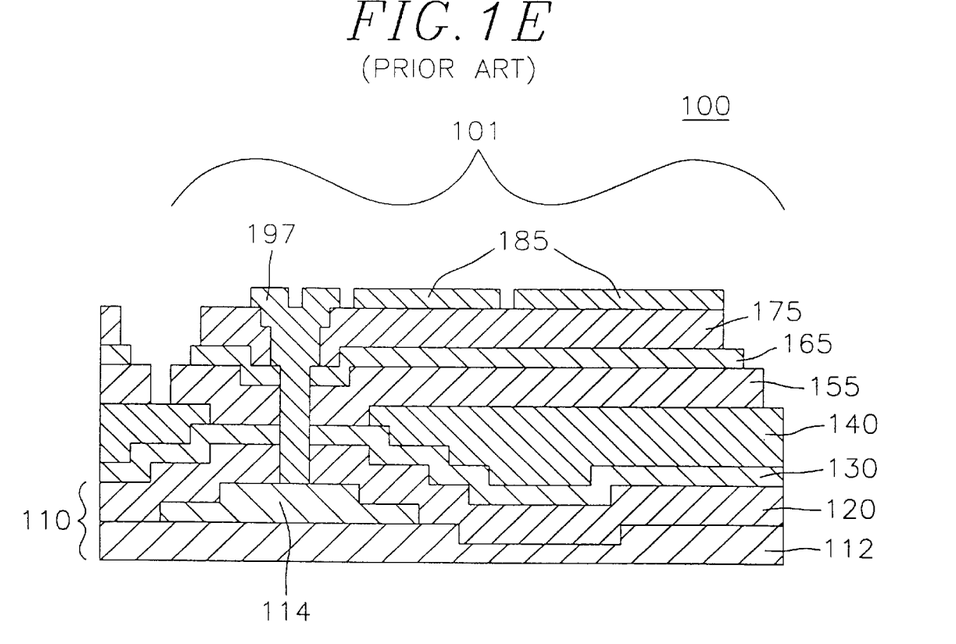

Next, the multiple layered structure 190 is patterned into an array of M×N actuated mirror structures by using a photolithography and a laser trimming method, until the thin film sacrificial layer 140 is exposed, in such a way that each of the actuated mirror structures includes a first thin film electrode 185, a thin film electrodisplacive member 175, a thin film second electrode 165 and an elastic member 155, as shown in FIG. 1E.

Figure 1F:
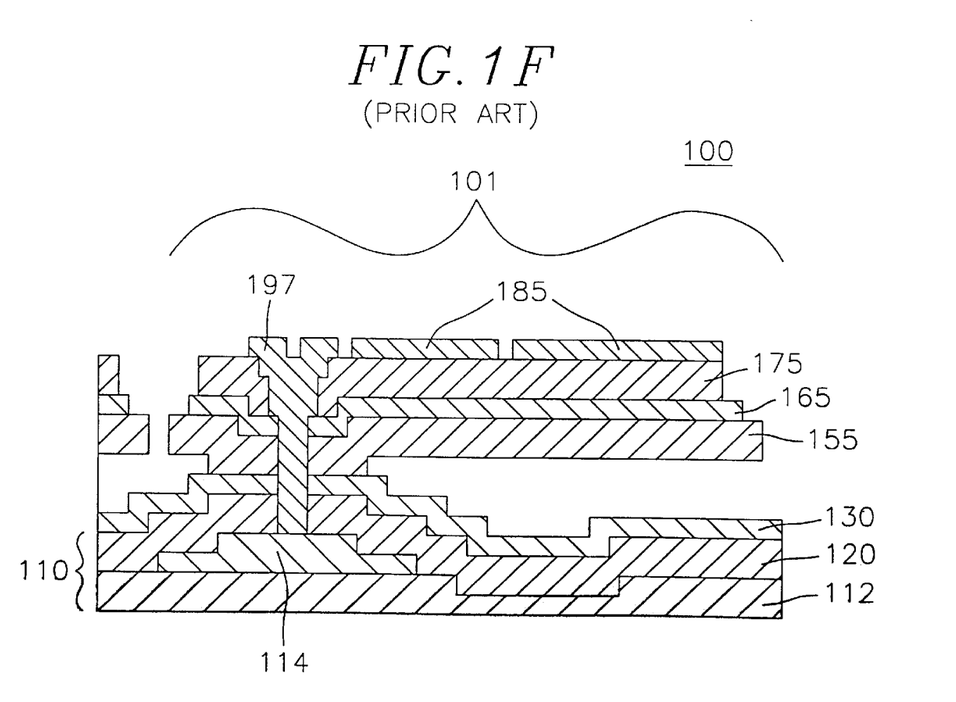

Finally, the thin film sacrificial layer 140 is then removed by using an etchant or a chemical to thereby form the array 100 of M×N thin film actuated mirrors 101, as shown in FIG. 1F.

There are certain deficiencies associated with the above described method for the manufacture of the array 100 of M×N thin film actuated mirrors 101. For example, during the patterning of the multiple layered structure 190, there is a possibility that, at regions where the patterns are made the iso-cuts overlap, portions of the etchant stopping layer 130 located below the iso-cuts may get removed if the iso-cuts made are too deep or incorrectly located. This may, in turn, cause portions of the passivation layer 120 and the active matrix 110 located below the removed portions of the etchant stopping layer 130 to be attacked and etched by the etchant used in removing the thin film sacrificial layer 140, resulting in the active matrix 110 becoming inoperable.

SUMMARY OF THE INVENTION

It is, therefore, an object of the present invention to provide a method for the manufacture of an array of M×N thin film actuated mirrors for use in an optical projection system the method being capable of preventing the etchant used in removing the continuous sacrificial area from attacking the active matrix.

In accordance with the present invention, there is provided a method for manufacture of an array of M×N thin film actuated mirrors, wherein M and N are integers, for use in an optical projection system, the method comprising the step of: preparing an active matrix including a substrate and an array of M×N connecting terminals; depositing an etchant stopping layer and a thin film sacrificial layer successively on top of the active matrix; forming an array of M×N pairs of empty cavities and a continuous sacrificial area in the thin film sacrificial layer to thereby form a combination layer; depositing an elastic layer made of insulating material on top of the combination layer, each of the empty cavities being filled with the insulating material; depositing a second thin film layer on top of the elastic layer; iso-cutting the second thin film layer into an array of M×N second thin film electrodes in such a way that each of the second thin film electrodes is disconnected from one another and iso-cuts are located on top of the continuous sacrificial area; depositing a thin film electrodisplacive layer and a first thin film layer to thereby form a multiple layered structure; forming an array of M×N conduits; patterning the multiple layered structure into an array of M×N actuated mirror structures, until the continuous sacrificial area is exposed, in such a way that each of the actuated mirror structures includes a first thin film electrode, a thin film electrodisplacive member, a second thin film electrode and an elastic member; and removing the continuous sacrificial area to thereby form the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

There are provided in FIGS. 2A to 2J schematic cross sectional views illustrating a method for manufacturing an array 200 of M×N thin film actuated mirrors 201, wherein M and N are integers, for use in an optical projection system in accordance with one embodiment of the present invention. It should be noted that like parts appearing in FIGS. 2A to 2J are represented by like reference numerals.

Figure 2A:
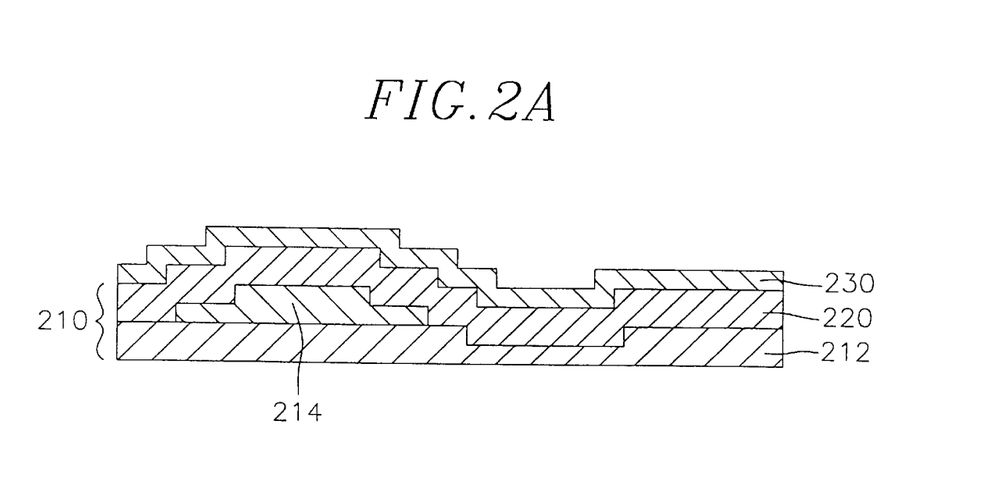
FIGS. 2A to 2J are schematic cross section views illustrating a method of manufacturing an array of M×N thin film actuated mirrors in accordance with the present invention.

The process for the manufacture of the array 200 begins with the preparation of an active matrix 210 including a substrate 212 and an array of M×N connecting terminals 214. The substrate 212 is made of an insulating material, e.g., Si-wafer.

In a subsequent step, there is formed a passivation layer 220, made of, e.g., PSG or BPSG, and having a thickness of 0.1–2 μm, on top of the active matrix 210 by using, e.g., a CVD method.

Thereafter, an etchant stopping layer 230, made of silicon nitride and having a thickness of 0.1–2 μm, is deposited on top of the passivation layer 220 by using, e.g., a CVD method, as shown in FIG. 2A.

Figure 2B:
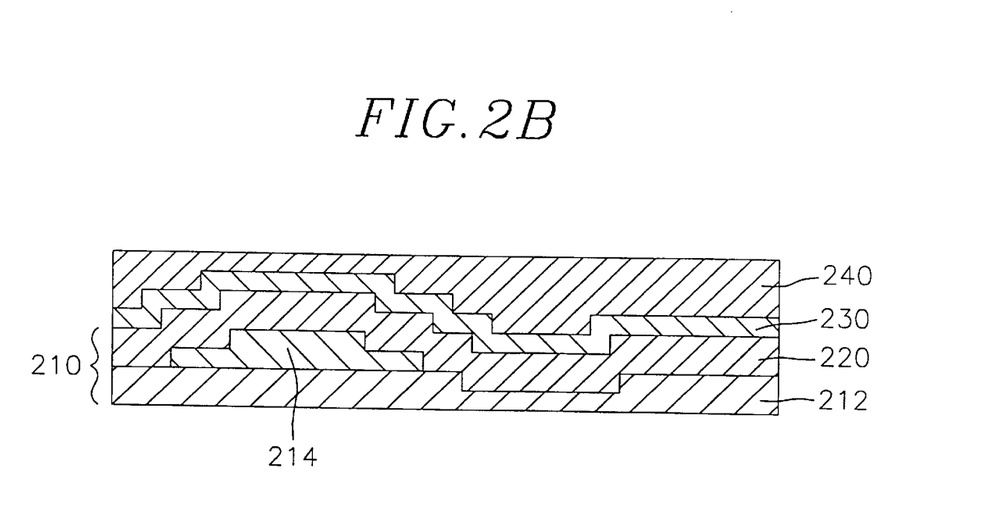

Then, a thin film sacrificial layer 240 made of, e.g., a PSG or poly-Si, and having a thickness of 0.1–2 μm, is deposited on top of the etchant stopping layer 230 by using a CVD or a physical vapor deposition (PVD), as shown in FIG. 2B.

Figure 2C:
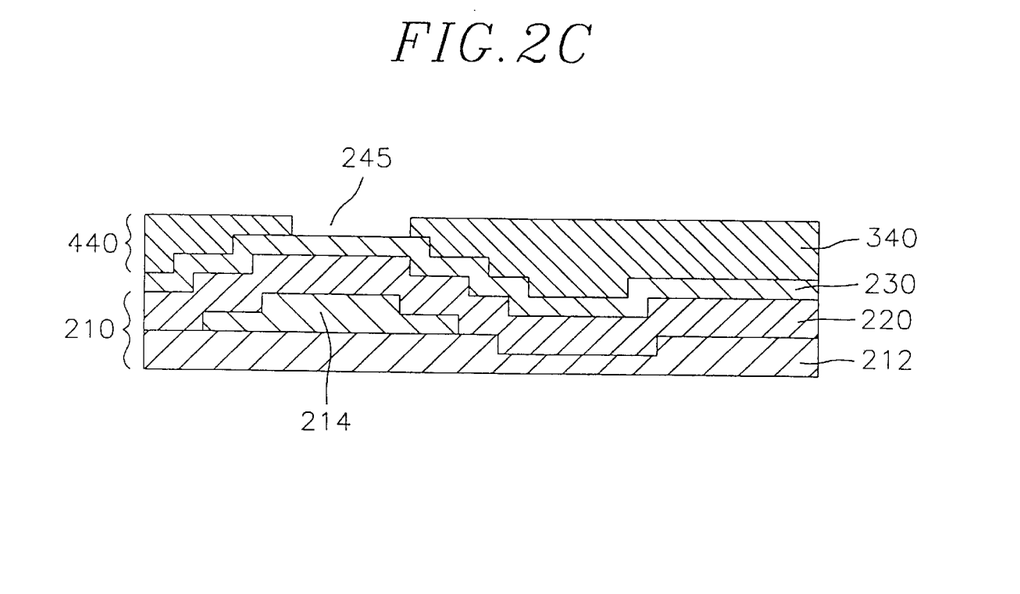

Subsequently, an array of M×N pairs of empty cavities 245 is created in the thin film sacrificial layer 240, wherein one of the empty cavities 245 in each pair is located above one of the connecting terminals, as shown in FIG. 2C, to form a combination layer 440 including the array of M×N pairs of empty cavities 245 surrounded by a continuous sacrificial area 340 on top of the etchant stopping layer 230.

Figure 2D:
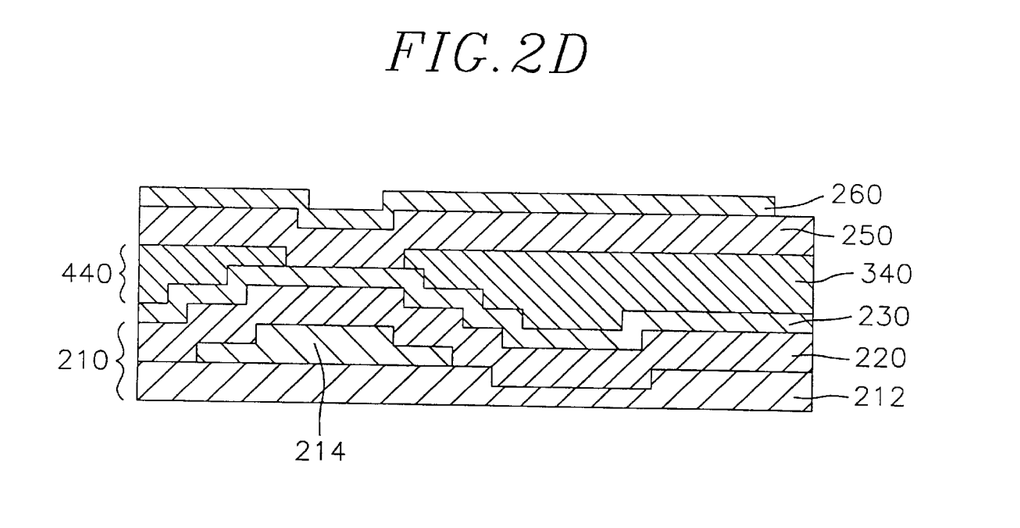

In a next step, an elastic layer 250, made of a nitride, e.g., silicon nitride, and having a thickness of 0.1–2 μm, is deposited on top of the combination layer 440, whereby each of the empty cavities 245 is filled with the same material, by using a CVD method.

In an ensuing step, a second thin film layer 260, made of an electrically conducting material, e.g., Al, Pt or Ta, and having a thickness of 0.1–2 μm, is formed on top of the elastic layer 250 by using a sputtering or a vacuum evaporation method, as shown in FIG. 2D.

Figure 2E:
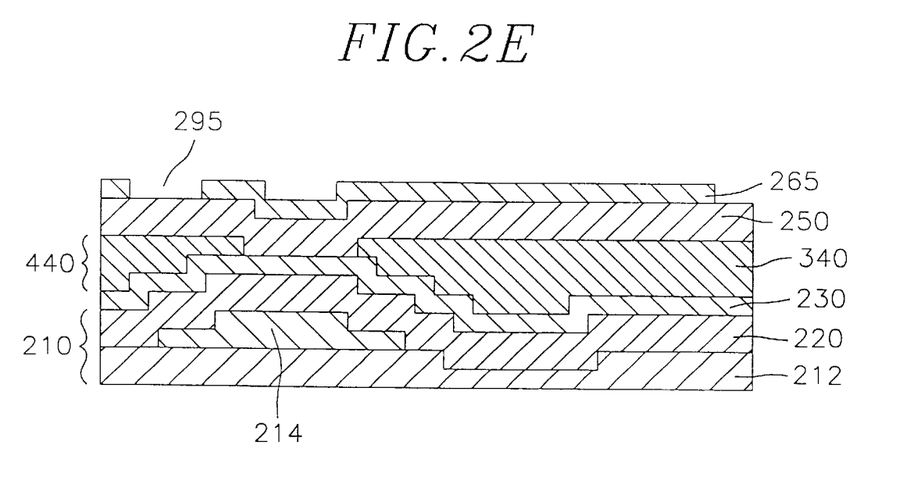

After the above step, the second thin film layer 260 is then iso-cut by using a dry etching method into an array of M×N second thin film electrode 265, each of the second thin film electrodes 265 being electrically disconnected from one another by an iso-cut region 295, as shown in FIG. 2E. It should be further mentioned the second thin film layer 260 is iso-cut in such a way that the iso-cut region 295 of the second thin film layer 260 are placed above the continuous sacrificial area 340.

Figure 2F:
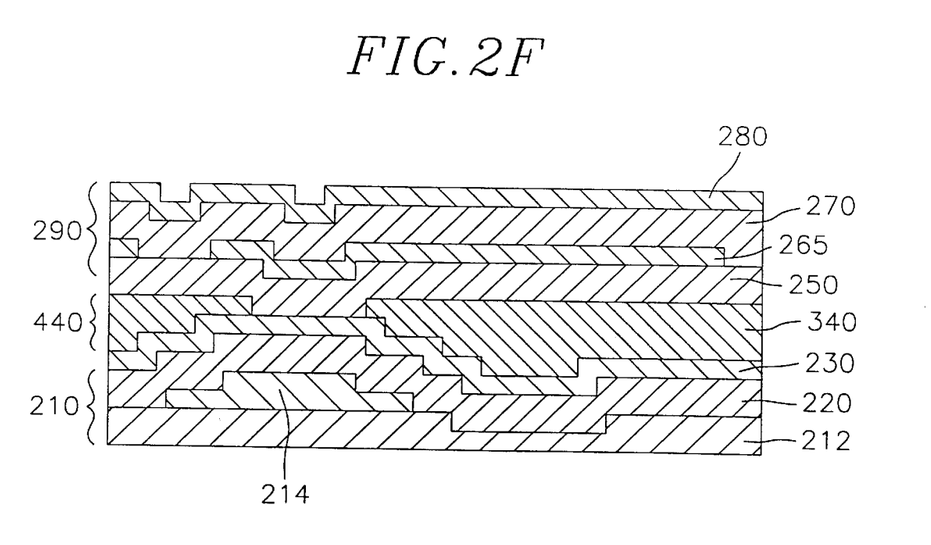

In a following step, a thin film electrodisplacive layer 270, made of a piezoelectric material, e.g., PZT, or an electrostrictive material, e.g., PMN, and having a thickness of 0.1–2 μm, is deposited on top of the second thin film layer 260 including the iso-cut region 295 by using an evaporation, a Sol-Gel, a sputtering or a CVD method.

Then, a first thin film layer 280, made of an electrically conducting and light reflecting material, e.g., Aluminum (Al), Platinum (Pt) or Titanium (Ti), and having a thickness of 0.1–2 μm, is formed on top of the thin film electrodisplacive layer 270 by using a sputtering or a vacuum evaporation method to thereby form a multiple layered structure 290, as shown in FIG. 2F.

Figure 2G:
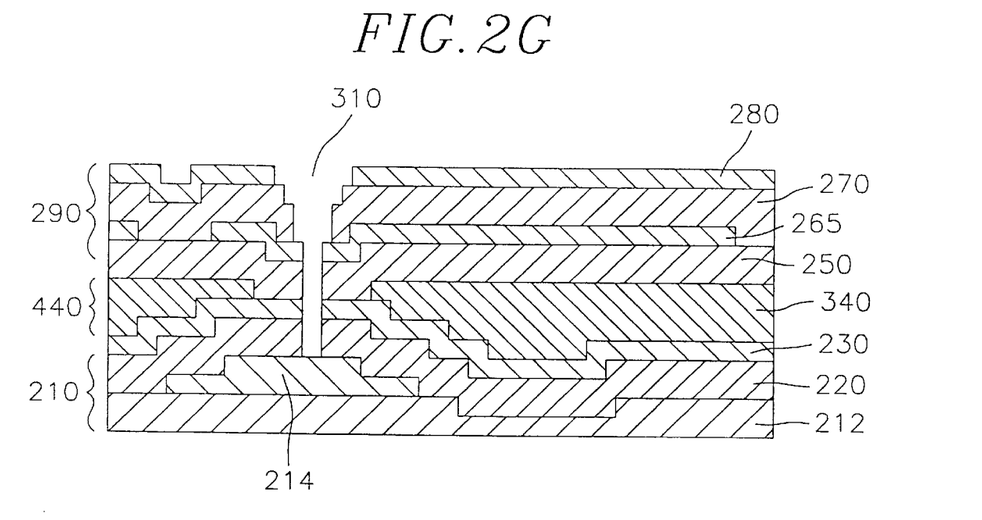

Next, there is formed an array of M×N holes 310, each of holes 310 extending from top of the first thin film layer 280 to top of the corresponding connecting terminal 214, as shown in FIG. 2G.

Figure 2H:
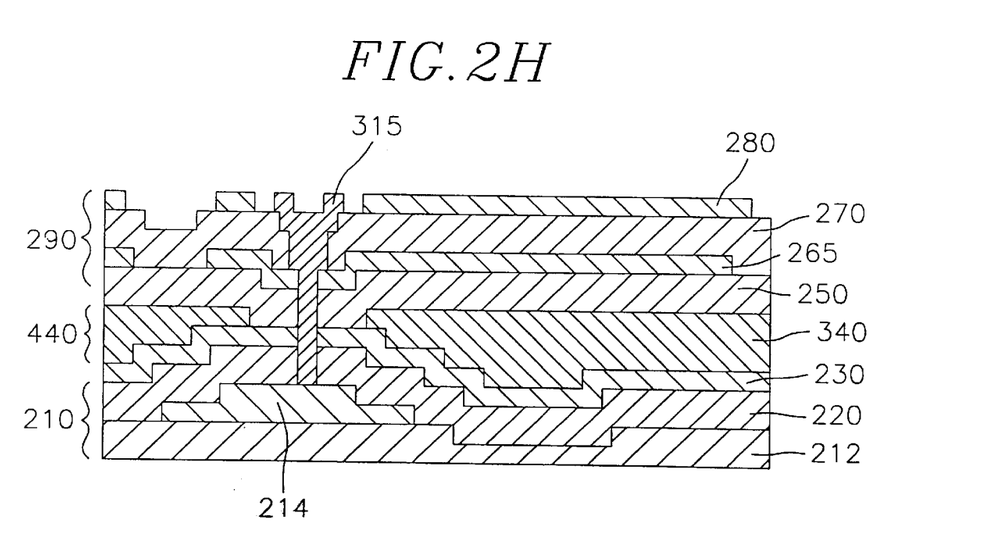

In a subsequent step, each of the holes 310 is filled with a metal, e.g, Tungsten (W), by using a lift-off method to thereby form an array of M×N conduits 315. The first thin film layer 280 is then patterned into an array of first thin film electrodes 285 in such a way that each of the conduits 315 is electrically disconnected from each of the first thin film electrodes 285, as shown in FIG. 2H.

Figure 2I:
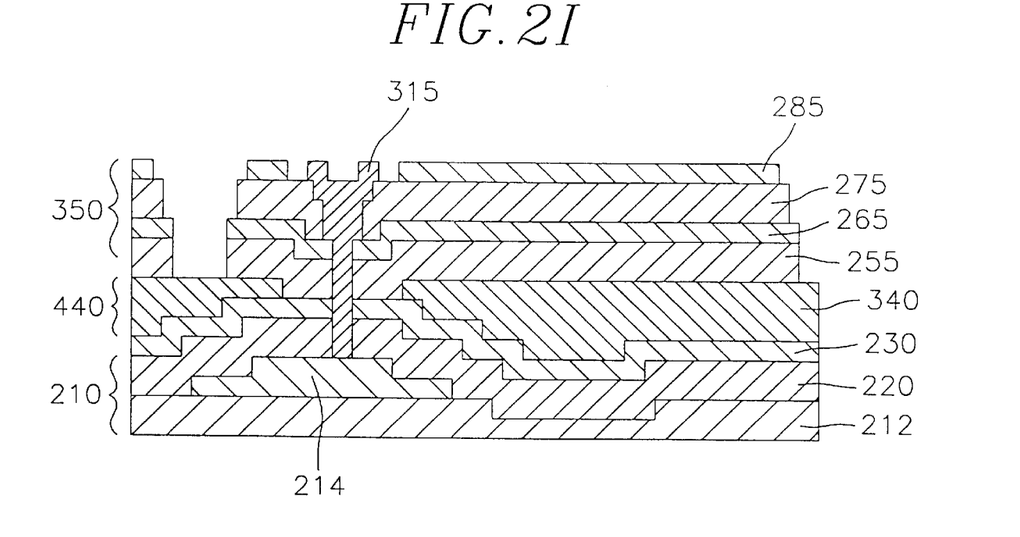

In an ensuing step, the multiple layered structure 290 is patterned into an array of M×N semiactuated mirror structures 350 by using a photolithography or a laser trimming method, until the continuous sacrificial area 340 is exposed. Each of the semiactuated mirror structures 350 includes a first thin film electrode 285, a thin film electrodisplacive member 275, a second thin film electrode 265, an elastic member 255 and a pair of conduits 315, as shown in FIG. 2I.

Figure 2J:
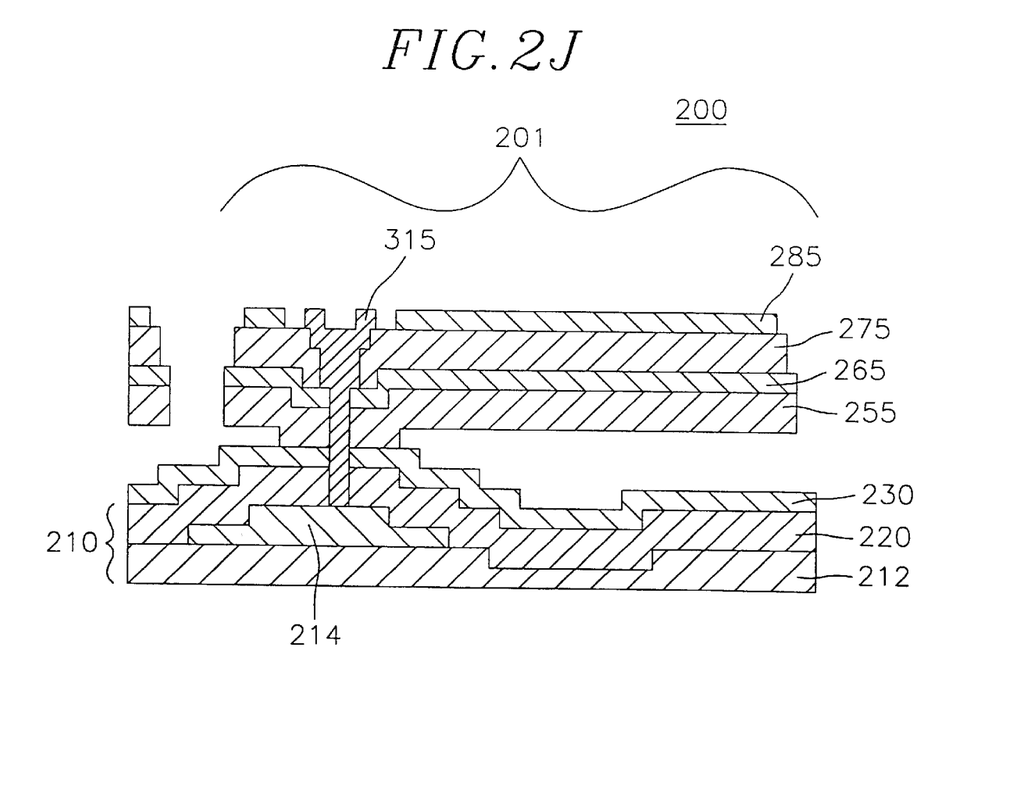

The continuous sacrificial area 340 is then removed by using an etchant or a chemical, e.g., hydrogen fluoride (HF), to thereby form the array 200 of M×N thin film actuated mirrors 201, as shown FIG. 2J.

In the inventive array 200 of M×N thin film actuated mirrors 201 and method for the manufacture thereof, during the forming of the semiactuated mirror structures 350, since the iso-cut 295 are placed above the continuous sacrificial area 340, even if the patterns and the iso-cuts 295 coinside, the etchant stopping layer 230 will not be damaged and hence during the removal of the continuous sacrificial area 340, the etchant will only attack the continuous sacrificial area 340, and the passivation layer 220 and the active matrix 210 located therebelow will not be affected.

While the present invention has been described with respect to certain preferred embodiments only, other modifications and variations may be made without departing from the spirit and scope of the present invention as set forth in the following claims.

What is claimed is:

1. A method for the manufacture of an array of M×N thin film actuated mirrors, wherein M and N are integers, for use in an optical projection system, the method comprising the steps of:

preparing an active matrix including a substrate and an array of M×N connecting terminals;

depositing an etchant stopping layer and a thin film sacrificial layer successively on top of the active matrix;

forming an array of M×N pairs of empty cavities and a continuous sacrificial area in the thin film sacrificial layer to thereby form a combination layer;

depositing an elastic layer made of insulating material on top of the combination layer, each of the empty cavities being filled with the insulating material;

depositing a second thin film layer on top of the elastic layer;

iso-cutting the second thin film layer into an array of M×N second thin film electrodes in such a way that each of the second thin film electrodes is disconnected from one another and iso-cuts are located on top of the continuous sacrificial area;

depositing a thin film electrodisplacive layer and a first thin film layer on top of the second thin film layer having iso-cuts to thereby form a multiple layered structure;

forming an array of M×N conduits from top of the first thin film layer to the top of corresponding connecting terminal;

patterning the multiple layered structure into an array of M×N actuated mirror structures, until the continuous sacrificial area is exposed, in such a way that each of the actuated mirror structures includes a first thin film electrode, a thin film electrodisplacive member, a second thin film electrode and an elastic member; and removing the continuous sacrificial area to thereby form the array of M×N thin film actuated mirrors.

2. The method of claim 1, wherein said step for preparing an active matrix further includes a step for forming a passivation layer on top of the active matrix.

3. A method for the manufacture of an array of M×N thin film actuated mirrors, wherein M and N are integers, for use in an optical projection system, the method comprising the steps of:

preparing an active matrix including a substrate and an array of M×N connecting terminals;

depositing a passivation layer and an etchant stopping layer on the active matrix, successively;

depositing a thin film sacrificial layer on top of the etchant stopping layer;

forming a pair of M×N empty cavities and a continuous sacrificial area in the thin film sacrificial layer to thereby form a combination layer;

depositing an elastic layer and a second thin film layer on top of the combination layer, successively;

iso-cutting the second thin film layer into an array of M×N second thin film electrodes such that iso-cuts are placed above the continuous sacrificial area;

depositing a thin film electrodisplacive layer and a first thin film layer on top of the second thin film layer having iso-cuts to thereby form a multiple layered structure;

forming an array of M×N conduits from top of the first thin film layer to the top of corresponding connecting terminal;

patterning the multiple layered structure into an array of M×N actuated mirror structures, each of actuated mirror structures having a first thin film electrode, a thin film electrodisplacive member, a second thin film electrode and an elastic member; and removing the continuous sacrificial area.

* * * * *